United States Patent [19]
Wolf et al.

[11] Patent Number: 5,546,525
[45] Date of Patent: Aug. 13, 1996

[54] COMPUTER USER INTERFACE WITH MULTIMODE SELECTION OF DISPLAYED CONTROLS

[75] Inventors: Richard J. Wolf, Sherborn; Donald J. Fossgreen, Worcester; Robert Rosen, Cambridge; Christopher M. Vento, North Andover, all of Mass.; Doris Wells-Papanek, Menlo Park, Calif.

[73] Assignee: Lotus Development Corporation, Cambridge, Mass.

[21] Appl. No.: 436,517

[22] Filed: Nov. 13, 1989

[51] Int. Cl.⁶ .................................................. G06F 3/14
[52] U.S. Cl. .......................... 395/159; 395/160; 395/155; 395/157; 395/156
[58] Field of Search .................................. 395/159, 160, 395/156, 155, 157, 158, 700; 340/721; 345/146, 902, 119, 120

[56] References Cited

U.S. PATENT DOCUMENTS

| | | | |
|---|---|---|---|
| 4,692,858 | 9/1987 | Redford et al. | 395/157 |
| 4,862,390 | 8/1989 | Weiner | 395/155 |
| 4,896,291 | 1/1990 | Gest et al. | 395/156 |
| 4,899,136 | 2/1990 | Beard et al. | 395/159 X |
| 5,040,131 | 8/1991 | Torres | 395/156 |
| 5,159,324 | 10/1992 | Ohtani et al. | 345/146 |
| 5,347,626 | 9/1994 | Hoeber et al. | 395/156 |

OTHER PUBLICATIONS

Microsoft Windows Version 2.0 User's Guide, 1987, pp. 79–95.

Microsoft Windows Write Version 2.0 User's Guide, 1987, pp. vii, 1–12.

Simon, "IBM To Show Software Products", *The Boston Globe*, May 16, 1989, pp. 41 and 46.

Robinson, "Now there's a way to teach Lotus 1–2–3 to obey mouse talk", *The Boston Globe*, Aug. 15, 1989, p. 31.

WordPerfect for IBM Personal Computers, Reference Manual Version 5.0, 1989, pp. 358–360.

IBM Technical Disclosure Bulletin, vol. 29, No. 3, Aug. 1986, "Display of Conditional Parameters Using Hierarchical Pop-up Panels".

F. Knoop et al., "Optimale Mensch–Maschine–Schnittstelle zur Führung von Versorgungsnetzen", Elektrotechnische Zeitschrift, vol. 109, No. 12, Jun. 1988, pp. 532–537. (translation included).

*Primary Examiner*—Raymond J. Bayerl
*Attorney, Agent, or Firm*—Fish & Richardson P.C.

[57] ABSTRACT

A computer user interface includes a system and methods to provide a control hierarchy, control marking, a hybrid grammar, and resized and/or repositioned dialog boxes. Control hierarchy divides controls, assigns each control a label, displays the labels according to a design hierarchy, and operates on the controls according to a functional hierarchy. Control marking distinguishes controls, via addition of graphic elements or changes in labels—referred to as glyphs. Hybrid grammar simultaneously allows a user to specify operations and data objects in a noun verb relationship or verb noun relationship. Finally, resized and/or repositioned dialog boxes enable a user to select a control that requires selection of data objects that are possibly obscured by the dialog box.

12 Claims, 7 Drawing Sheets

Microfiche Appendix Included
(2 Microfiche, 92 Pages)

FIG. 1

Range Alignment

▼ Labels

- ○ Left
- ○ Right
- ⦿ Center
- ○ Fill
- ○ Global

▼ Values

- ○ Left
- ○ Right
- ○ Center
- ⦿ Global

▼ Cell Display

- ○ Long Labels
- ○ Short Labels
- ⦿ Global

Range(s): A1

OK
Cancel

```
Sample RC file script for a Hierarchical Dialog Box define DTemp        1
define DBox         (2 | NCDA_HIERARCHY)
#define ID_X         (3 | NCDA_HIERARCHY)
    #define ID_A   4
    #define ID_B   5
#define ID_Y         (6 | NCDA_HIERARCHY)
    #define ID_C   7
    #define ID_D   8
#define ID_Z         (9 | NCDA_HIERARCHY)
    #define ID_E   10
    #define ID_F   (11 | NCDA_AUTOCONFIRM)

DLGTEMPLATE DTemp LOADONCALL MOVEABLE DISCARDABLE
BEGIN
    DIALOG "W", DBox, x, y, cx, cy, WS_VISIBLE,
            (FCF_TITLEBAR | FCF_DLGBORDER)
    BEGIN
        CONTROL "-X", ID_X, x, y, cx, cy, WC_STATIC,
            (SS_GROUPBOX | WS_VISIBLE | NCDS_LEVEL |
             DT_TOP | DT_LEFT | DT_MNEMONIC)
        BEGIN
            CONTROL "-A", ID_A, x, y, cx, cy, WC_BUTTON,
                (BS_AUTORADIOBUTTON | WS_VISIBLE | WS_TAB-
STOP)
            CONTROL "-B", ID_B, x, y, cx, cy, WC_BUTTON,
                (BS_AUTORADIOBUTTON | WS_VISIBLE | WS_TAB-
STOP)
        END
        CONTROL "-Y", ID_Y, x, y, cx, cy, WC_STATIC,
            (SS_GROUPBOX | WS_VISIBLE | NCDS_LEVEL |
             DT_TOP | DT_LEFT | DT_MNEMONIC)
        BEGIN
            CONTROL "-C", ID_C, x, y, cx, cy, WC_BUTTON,
                (BS_AUTORADIOBUTTON | WS_VISIBLE | WS_TAB-
STOP)
            CONTROL "-D", ID_D, x, y, cx, cy, WC_BUTTON,
                (BS_AUTORADIOBUTTON | WS_VISIBLE | WS_TAB-
STOP)
        END
        CONTROL "-X", ID_Z, x, y, cx, cy, WC_STATIC,
            (SS_GROUPBOX | WS_VISIBLE | NCDS_LEVEL |
             DT_TOP | DT_LEFT | DT_MNEMONIC)
        BEGIN
            CONTROL "-E", ID_E, x, y, cx, cy, WC_BUTTON,
                (BS_AUTORADIOBUTTON | WS_VISIBLE | WS_TAB-
STOP)
            CONTROL "-F", ID_F, x, y, cx, cy, WC_BUTTON,
                (BS_AUTORADIOBUTTON | WS_VISIBLE | WS_TAB-
STOP)
            CONTROL "Ok", IDOK, x, y, cx, cy, WC_BUTTON,
                (BS_PUSHBUTTON | BS_DEFAULT | WS_VISIBLE |
WS_GROUP |
                 WS_TABSTOP)
            CONTROL "Cancel", IDCANCEL, x, y, cx, cy, WC_BUTTON,
                (BS_PUSHBUTTON | WS_VISIBLE | WS_TABSTOP)
        END
    END
END
```

FIG.7

COMPUTER USER INTERFACE WITH MULTIMODE SELECTION OF DISPLAYED CONTROLS

REFERENCE TO MICROFICHE APPENDIX

The application includes a microfiche appendix pursuant to 37 C.F.R. 1.96 having two fiche with 92 frames.

BACKGROUND OF THE INVENTION

The invention relates to the interface between a user and a computer.

The interface between a user and a computer is usually defined by the software application the user is running on the computer. That is, the command structure of the application defines how users initiate commands or choose options and how they respond to the computer's actions in order to manipulate data in the computer.

Some interfaces, however, are defined in part by a window manager such as Presentation Manager® as well as by the particular software application the user is running. The window manager provides support for areas of the screen, i.e., "windows", which in Presentation Manager® include "dialog box windows" and "controls". (Other applications use different terminology to refer to window elements.)

Some elements in the command structure pioneered in the Xerox Star® interface and popularized in the Apple Macintosh® interface are assigned a graphic object, referred to here as a control, which appears in a dialog box. In such an interface, when a user initiates a command, a dialog box appears and the user selects various controls to complete the command. For example, an oval "push button" indicates a command, e.g., "OK" to accept the contents of a dialog box or "Cancel" to escape from a dialog box. A circular "radio button" indicates one of a number of options which are usually mutually exclusive, e.g., one of a number of ways to align text. A square "check box" allows the user to toggle between options. A "list box" lists a plurality of options. And an "edit control box" allows the user to enter and edit text, e.g., a range of cells in a spreadsheet.

To issue a command, then, the user "selects" a control with a mouse, keyboard mnemonic, or similar device. For example, the user can use a mouse to position a cursor over a particular control and then click the mouse buttons to select the control. Or in some interfaces, e.g., Presentation Manager, the user can type a keyboard mnemonic, e.g., a letter of a label that identifies a control, to select the control.

In order for an application to be able to associate a mouse click in a some area of a computer screen or a keyboard mnemonic with a particular control, each control is associated with a control window and each control window is defined by its attributes, e.g., location, contents, state, etc. Each control window is in turn associated with a dialog box and its dialog box window.

SUMMARY OF THE INVENTION

The invention is a computer user interface that provides a control hierarchy, i.e., a method of providing a controls in a software application comprising the steps of: dividing the controls into functional hierarchical groups; assigning labels to each of the controls and each of the groups; displaying the labels according to a design hierarchy; and operating on the controls according to the order of the functional hierarchical groups.

The invention further provides control marking, i.e., a method of distinguishing a control within a software application or dialog box, the controls being divided into groups having a hierarchical organization, comprising the steps of: determining which of the of controls are available to a user; generating a glyph for each of the available groups of controls; displaying one of the glyphs in proximity to each of the available groups of controls; accepting a signal from an input device, e.g., a keyboard, mouse, or similar device, to select one of said available groups of controls; removing the glyphs in proximity to each of said available groups of controls; determining in response to the signal which of the controls within the selected group are available to a user; generating a glyph for each of the available controls; displaying the glyphs in proximity to each of the available controls; accepting a signal from an input device to select one of the available controls within the selected group of controls; and removing said glyphs in proximity to each of the available groups of controls.

The feature of control marking further provides a method of implementing a dialog box adapted for use with selections via keystroke mnemonics while at the same time preserving the functionality of selections via a mouse or similar device. The method comprises the steps of: simultaneously displaying a plurality of controls in the dialog box; graphically distinguishing one subset of the controls which is available for selection; enabling selection via keystrokes exclusively from the one subset of controls; in response to a selection from the one subset of controls, graphically distinguishing another subset of said controls; and enabling selection via keystrokes exclusively from said other subset of controls.

The invention further provides a hybrid grammar, i.e., a method of enabling selection among data objects and operations specified within a screen or dialog box comprising the steps of: enabling selection of one of the data objects and then selection of one of the operations to perform on the data object; and enabling selection of one of the operations and then selection of one of the data objects on which to perform the operation.

Finally, the invention provides a method for resizing and/or repositioning dialog boxes in a screen comprising a plurality of data objects and a dialog box comprising a plurality of controls and a plurality of operations. The method comprises the steps of: generating the dialog box; enabling selection of one of the controls within the dialog box wherein the control corresponds to one of the operations and wherein the operation requires selection among said data objects; in response to a selection of the control in the dialog box, altering display of the dialog box, e.g., by resizing the dialog box or repositioning the dialog box; enabling selection of the data objects within the screen; in response to a selection of the data objects within the screen, again altering display of the dialog box; and executing said operation on said selected data objects.

These and other features and advantages of the present invention will be apparent from the following description of a presently preferred embodiment and from the claims.

DESCRIPTION OF THE PREFERRED EMBODIMENT

FIG. 7 is a definitions file produced by the application module of the system.

The present invention provides an interface between a computer and a user. Although the interface is described below in connection with a window manager (i.e., Presentation Manager®) and a software application that provides spreadsheets (i.e., Lotus 1-2-3/G™), the use of the window manager and the focus on spreadsheet applications is in no way intended to limit the scope of the invention.

Control Hierarchy

The interface provides a "control hierarchy" which divides controls into groups and separates groups of controls within a dialog box. Other systems separate controls into groups for visual purposes, but the present invention separates controls in order to impose functionality, i.e., logical and operational structure on the controls. Separating groups of controls better ensures that each group of controls and each control within a group has an unique mnemonic, preferably a first letter mnemonic, and allows the application's designer to structure the dialog box in a logical fashion. The hierarchy and selection of unique mnemonics is described below in connection with FIGS. 1 and 2.

Figure 1:
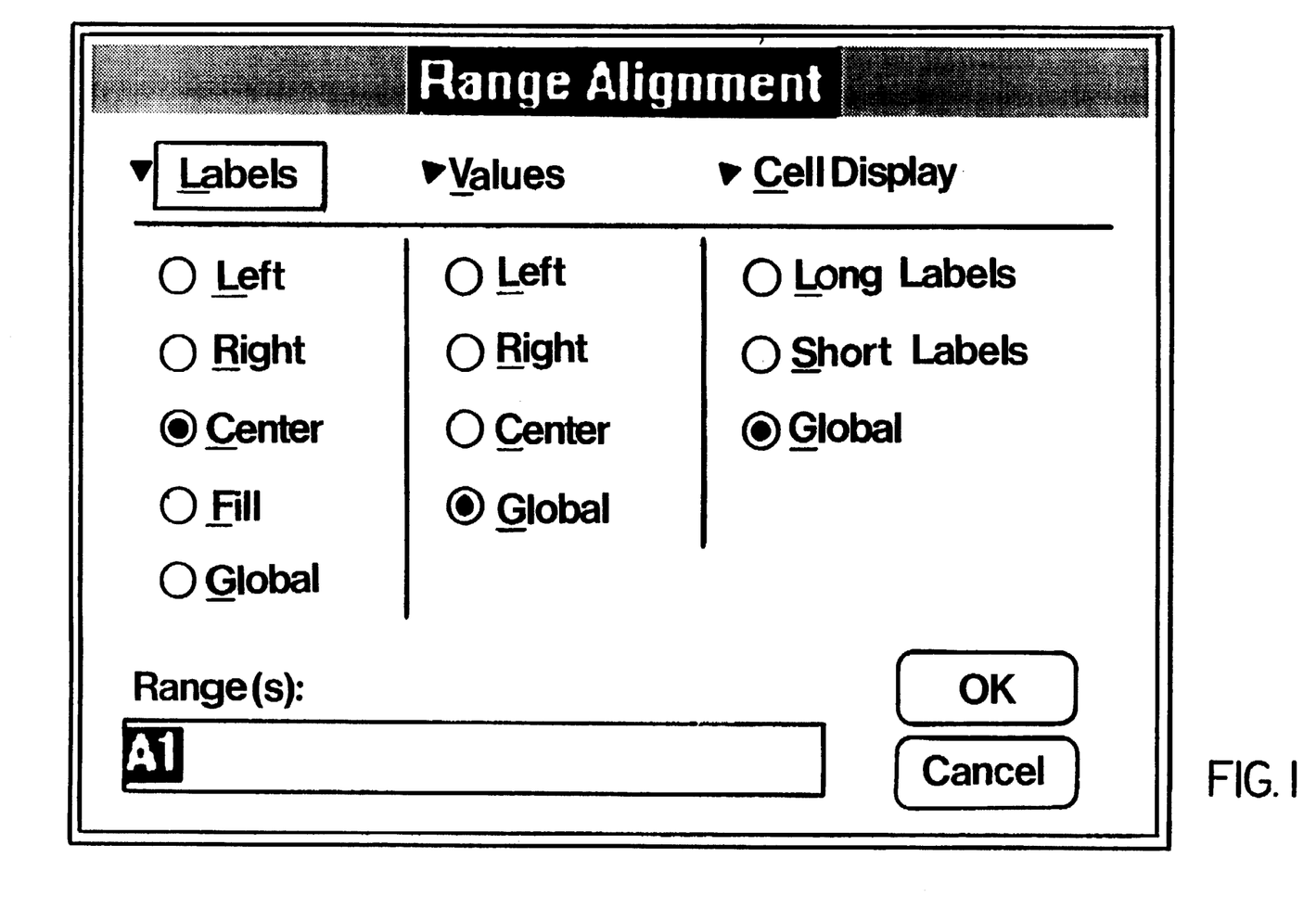
FIG. 1 is a pictorial representation of a screen that shows a dialog box that uses a control hierarchy according to the interface of the present invention.

Referring to FIG. 1, a dialog box "Range Alignment" is shown. A user selects a group of controls in the dialog box by typing the group's mnemonic, or by positioning a cursor on the group and pressing ENTER, or by positioning a mouse pointer over the group and clicking a mouse button. For example, "L" selects the "Labels" group. Once the user has selected a group, if the user selects another control by typing another mnemonic, he selects a control within the selected group. For example, referring to FIG. 2, if the user has selected the "Labels" group, and then the user types "C", he selects the "Center" control under "Labels", not the "Center" control under "Values". Thus, the hierarchical structure allows controls in different groups to have the same mnemonic. For example, the controls "Left", "Left", and "Long Labels" all have the same mnemonic "L" but each mnemonic is unique within its group. This approach differs from prior approaches in which there is a single hierarchy (all controls being within that hierarchy) and all controls are available for selection via a keystroke mnemonic. Note that the approach of the present interface applies to keystrokes, i.e., keystroke mnemonics. Selections via a mouse pointer are not restricted by control hierarchy.

Figure 2:
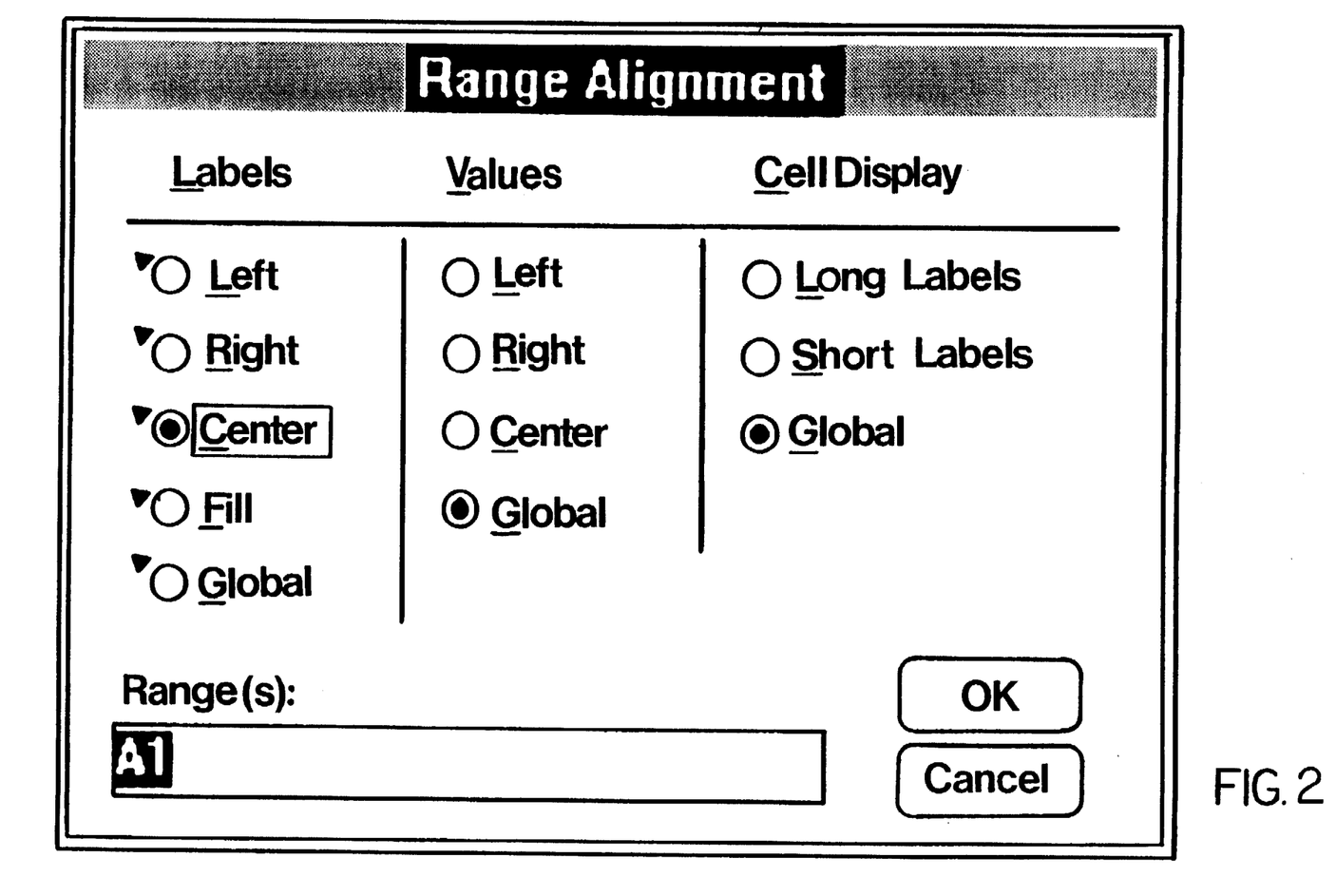
FIG. 2 is a pictorial representation of a screen that shows a dialog box having control marking as defined by the interface.

A visual design hierarchy communicates the hierarchy of controls in a dialog box via consistent layout and symbols. For example, as shown in FIGS. 1 and 2, gray horizontal lines separate levels of a hierarchy, while black vertical lines separate peers in a hierarchy. So-called "white space", e.g., the space that separates the "OK" and "Cancel" push buttons from the "Range(s)" edit control box, separates controls that require visual grouping unrelated to the mnemonic hierarchy.

Control Marking

The interface also provides a method of "control marking" that distinguishes which controls a user can selected via keystroke mnemonics at a particular time by placing a "glyph" e.g., a graphic symbol such as a small triangle or an underline, near the label of each available control. Alternatively, available controls can be marked by changing the label of each control, e.g., by changing the font or color of all or part of the label. Labels thus changed are also referred to herein as glyphs.

Glyphs dynamically appear and disappear to indicate which controls are available as the user enters successive keystroke mnemonics. For example, referring again to FIG. 1, the user has just called up the dialog box "Range Alignment". The initial focus of the controls is the label identifying one group of controls in the dialog box, i.e., "Labels". The focus is emphasized by placing the group title inside a dotted border, according to a window manager default behavior. In addition to the default behavior, however, the interface places glyphs near each of the group controls, "Labels," "Values," and "Cell Display," to indicate that they can be selected via keystrokes. This differs from default convention in which all controls have equal hierarchy and are equally available. Here, the marked controls are the only controls available.

Once the user selects one of the controls available in FIG. 1, however, the interface marks the controls within the group with glyphs. Referring to FIG. 2, for example, if a user selects the "Labels" control in FIG. 1, the initial focus is again moved to the first control within the selected group, i.e., "Left" is emphasized by placing the control title inside a dotted border. In addition to the default setting, however, the interface places glyphs near the "Left," "Right," "Center," "Fill," and "Global," controls to indicate that they are available.

In the illustrated embodiment, the labels for the controls have underscores at all times to indicate the keystroke mnemonics that select the controls. Therefore, the glyphs herein are provided in addition to the underscores. That is, glyphs dynamically change to indicate available groups of controls while the underscores remain present for all controls—even those that are not available.

An alternative embodiment would dispense with separate glyphs, e.g., triangle glyphs, and employ dynamic rather than static underscoring. This is accomplished by applying underscoring only to available groups of controls. In this alternative embodiment, the underscore serves two functions, i.e., to indicate the members of the available group of controls as well as the mnemonics. An added benefit of the alternative is that unavailable mnemonics are not displayed at the same time as available ones. However, the underscore is, of course, only one way of indicating the mnemonic. As mentioned above, other ways include changing the color or font of the mnemonic character in a label, for example. Any of these other ways also indicate which mnemonics are available to the user and are a dynamic means of indicating the available control groups as well as indicating the mnemonics for selecting the individual controls.

In general, the interface and its associated software application use hierarchical dialog boxes that provide a user with the mnemonics necessary to maintain keystroke compatibility with a previous version of a software application that does not use dialog boxes, e.g., as with Lotus software 1-2-3/G™ and its predecessor 1-2-3®. The interface also provides improved support for keyboard use of an interface that uses dialog boxes.

Verb/Noun and Noun/Verb Hybrid Grammar

The interface of the present invention uses a hybrid grammar which allows the user to initiate actions in either a "verb noun" or "noun verb" approach. The hybrid grammar effectively combines the verb noun approach used in previous software applications and the noun verb approach used in Presentation Manager® and object oriented programming applications. In the verb noun approach, the user selects a command (verb) and then the object of the command (noun), e.g. "ERASE" followed by a specified range of spreadsheet data to erase. In the noun verb approach, the user selects an object (noun) and then specifies what to do (verb) with the object. For example, to erase the contents of a range of spreadsheet cells, the user selects the range and then initiates the erase command.

Figure 3:
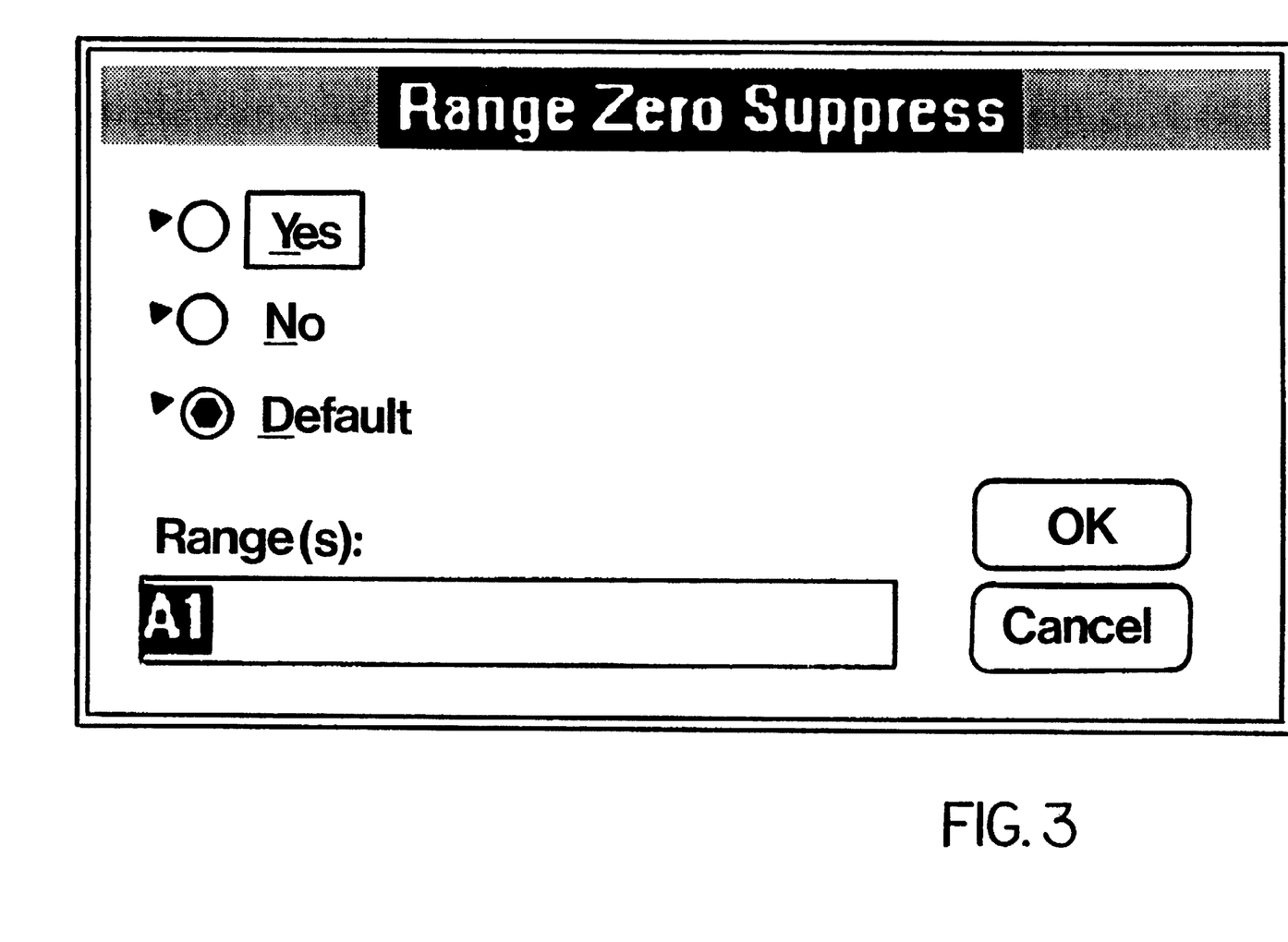
FIG. 3 is a pictorial representation of a screen that shows a dialog box that uses hybrid grammar according to the interface.

In the hybrid grammar approach, the interface prompts the user to select an object after he selects a command, as in the verb noun approach. However, the user can select an object before issuing a command, as in the noun verb approach. For example, referring to FIG. 3, the user can issue the "Range Zero Suppress" command which calls up the "Range Zero Suppress" dialog box and then select a range of cells on which to perform the option—a verb noun approach. On the other hand, the user can select a range of cells and issue the "Range Zero Suppress" command which calls up the "Range Zero Suppress" dialog box—a noun verb approach. In both cases, the selected range or a default range is automatically written into an edit control box that specifies the selection, e.g., "Ranges" in FIG. 3, and the user can then select the commands to perform on the range. In the verb noun approach the user can change the selection, whereas in the noun verb approach the user need not change the selection having already selected the relevant data prior to invoking the option.

Resized Dialog Boxes

Figure 4:
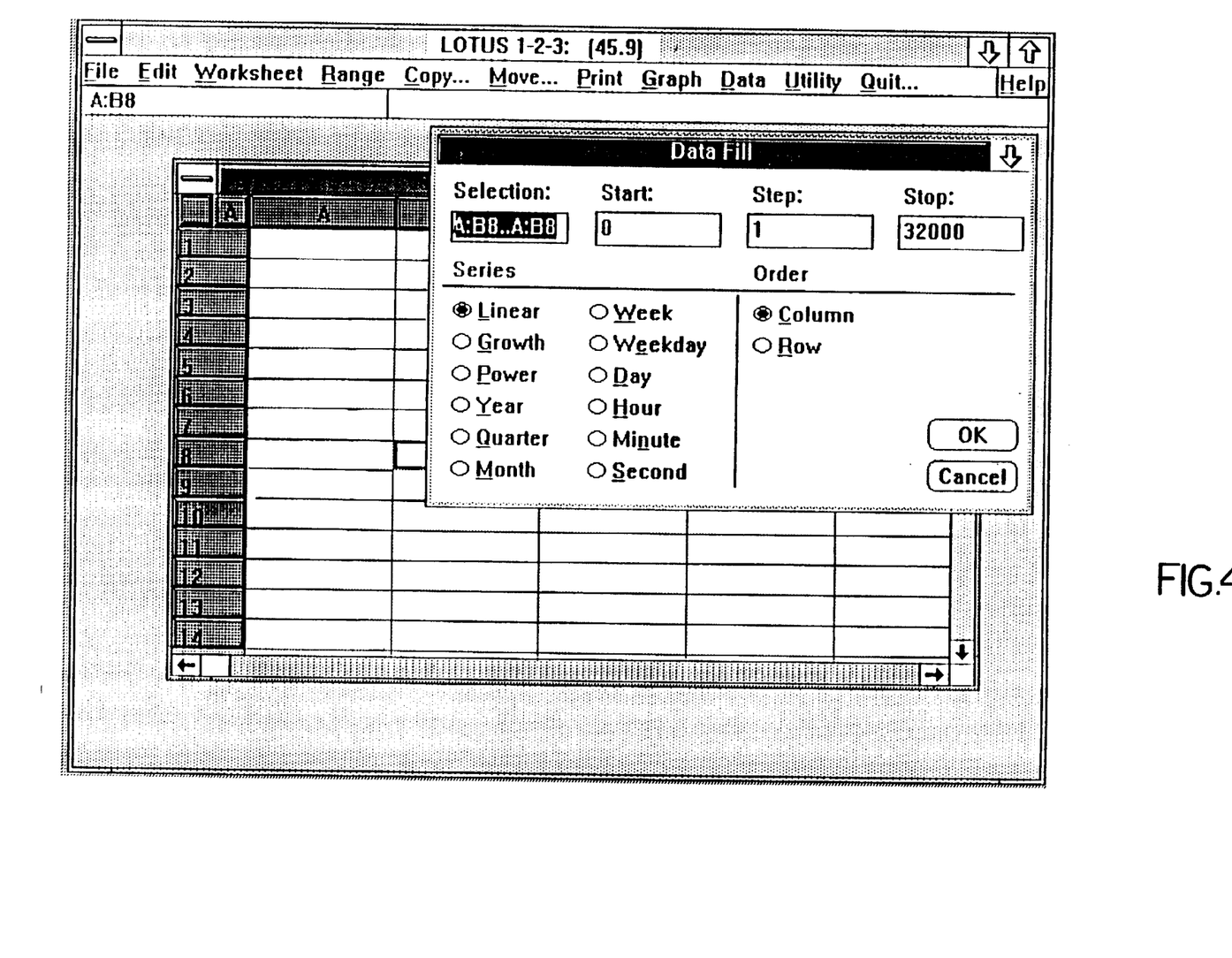
FIGS. 4 and 5 are pictorial representations of screens that show a dialog box resized and repositioned according to the interface.
Figure 5:
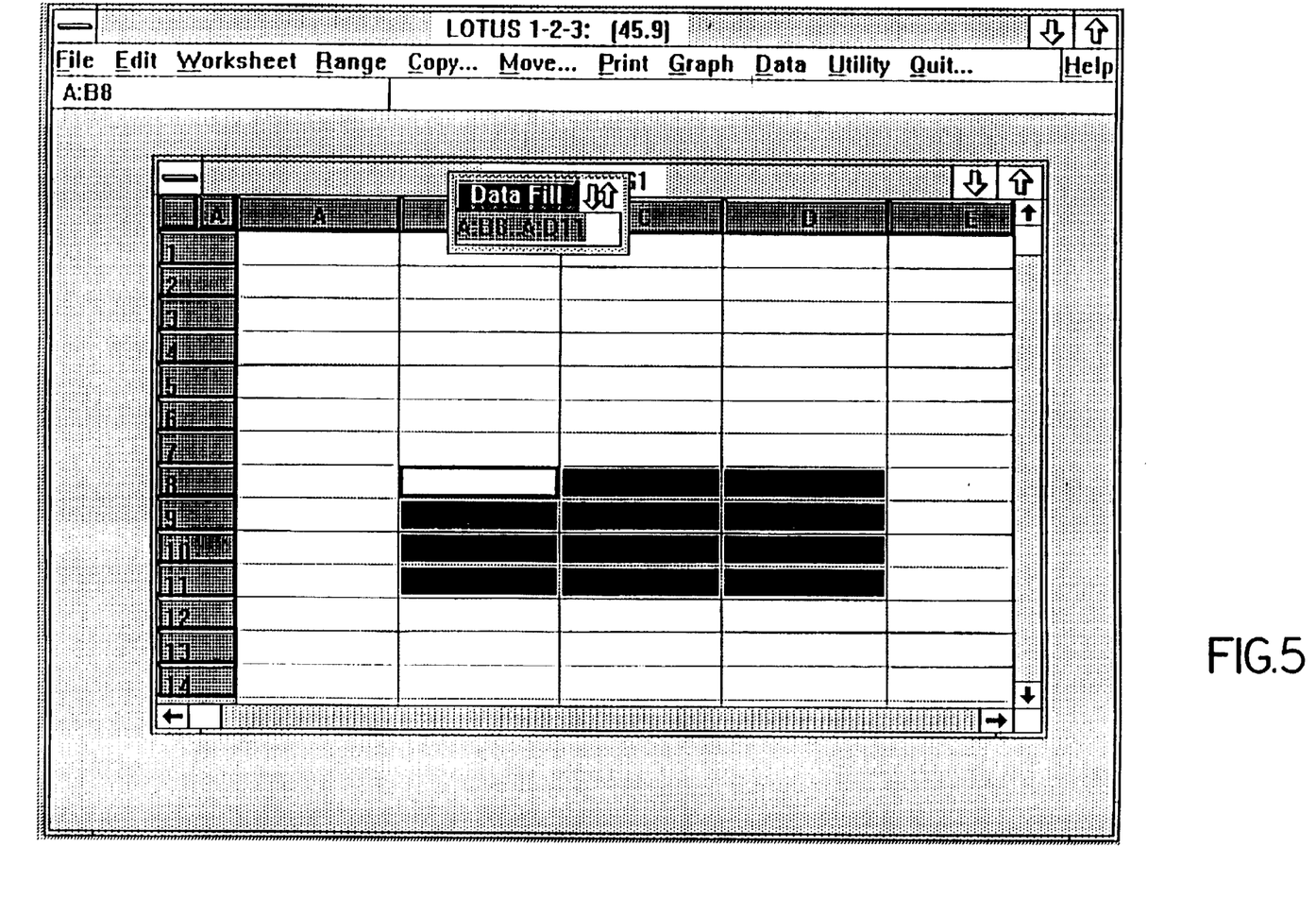

The interface also automatically resizes and/or repositions a dialog box that interferes with completion of an operation. For example, referring to FIG. 4, the dialog box "Data Fill" covers a part of the spreadsheet from which the range of cells for the edit box "Selection" is to be selected, making it difficult for the user to be sure of what cells he wants to select. Referring to FIG. 5, then, once the user selects the edit control box "Selection" in FIG. 4, the interface automatically resizes and/or repositions the dialog box, so that it covers less of the spreadsheet and the user can more easily select a range of cells. Once the user has selected a range of cells, the dialog box is returned to its original size and position. Alternatively, the interface can remove the dialog box from the screen entirely and replace it once the operation is complete.

In addition, note that the resizing feature aids the full verb noun and noun verb functionality from within the context of a dialog box described above. In the past, for example, the user would have had to define a range before invoking the dialog box that operates on the range.

Detailed Description of the Interface Implementation

The interface system of the present invention is "event driven." That is, the actions of the interface are based on a software application's definition of a dialog box and controls within the dialog box, the processing of events caused by a user's interaction with the controls in the dialog box, and the processing of messages resulting from the events. The various components of the interface and the processing of events and messages are described below in connection with FIG. 6.

Figure 6:
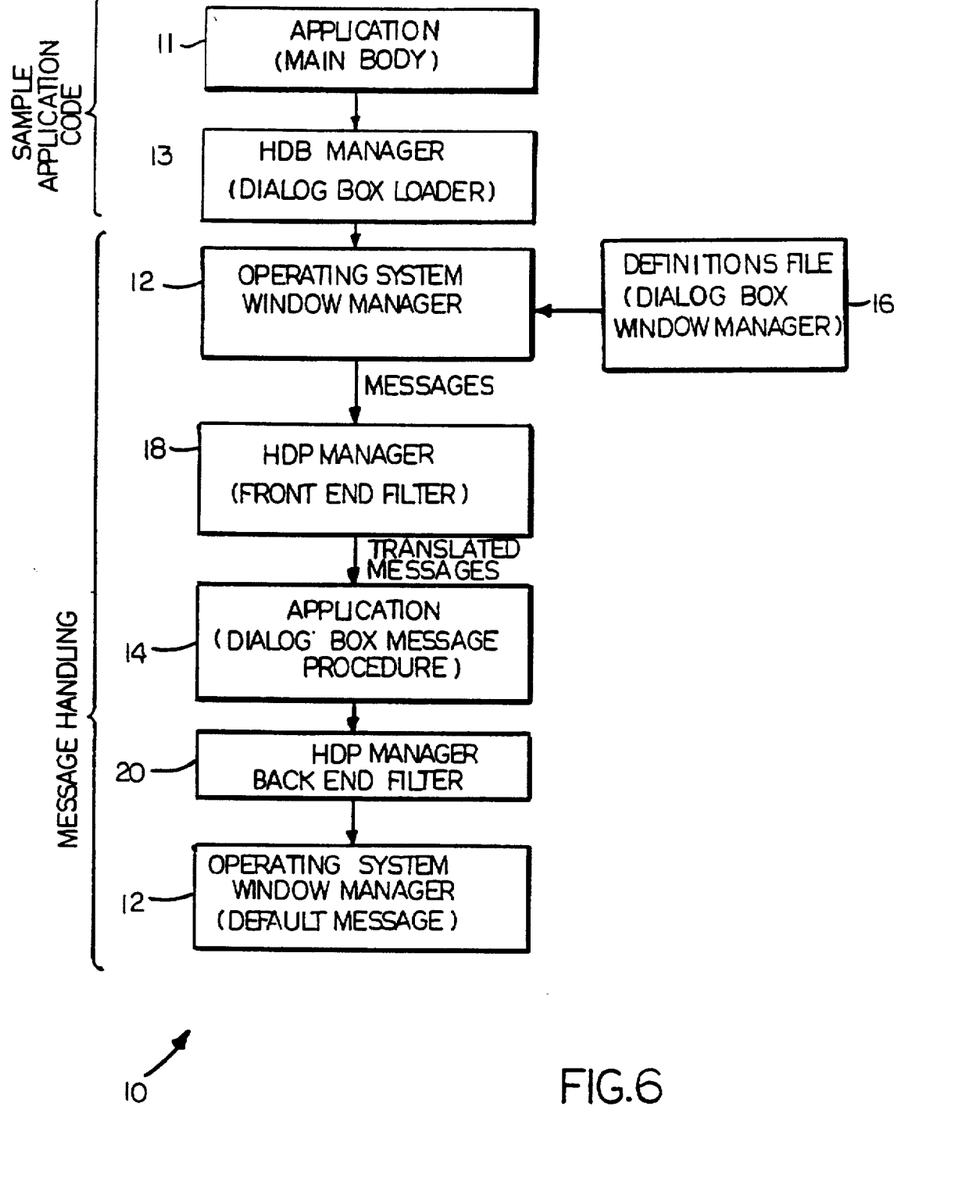
FIG. 6 is a block diagram that shows the modules of the interface and the general message flow of a system according to the present invention.

Referring to FIG. 6, an interface system 10 includes a main body 11 of a software application and an operating system and window manager 12 (OS/WM), e.g., OS/2® and Presentation Manager®, which controls the primitive operations that generate control windows and dialog box windows. The main body 11 calls a HDB manager dialog box loader 13 which loads and displays the dialog box and starts message handling. A dialog box procedure 14 in the software application presents the dialog boxes and controls within the windows generated by the OS/WM 12. For example, referring to FIG. 2, the OS/WM 12 generates the dialog box window in which the 1-2-3/G™ spreadsheet application presents a "Range Alignment" dialog box. The OS/WM 12 also generates the control box windows within the dialog box window and each control window contains a control. For example, in the "Range Alignment" dialog box there are a number of controls including the commands "OK" and "Cancel", the options "Left", "Right", "Center", and "Fill", and the edit control box "Range(s)".

Also, referring to FIG. 6, the software application 14 defines the attributes of each control window and dialog box window in a definitions file 16. The attributes include, for example, location, boundaries, type, contents, state, and relation to other windows (referred to as "hierarchy"). For example, the control window for "Fill" in FIG. 2 has the type "option" and the contents "Fill"; its state is checked or unchecked; and it is hierarchically organized under the "Labels" control window.

The hierarchical relationship between the controls in the dialog box is established by arranging the statements in the definitions file 16 according to the arrangement of controls in the dialog box. A sample definitions file is shown in FIG. 7. For example, referring to FIG. 7, a statement uses the hierarchical BEGIN and END keywords (or '{' and '}') to delimit the start and end of a level in the hierarchy respectively and BEGIN/END blocks are nested in tree-like fashion in order to represent the levels of the hierarchy. Controls that are identified by statements between the BEGIN/END block represent child windows of the parent window denoted by the CONTROL or DIALOG statement that immediately precedes the BEGIN/END block. The processing of "events" within these windows and "messages" resulting from the events is described next.

An "event" is some action taken within the boundaries of a window. For example, an event occurs when a user selects a control, such as when a user positions a mouse on a radio button and clicks the mouse button. Numerous "messages" result from such a selection. For example, the selection might generate messages that instruct the OS/WM 12 to redraw the control window in a different state, e.g., selected, and instruct the application 14 to take the action associated with the control window.

Referring again to FIG. 6, when a user selects one of the controls, the OS/WM 12 produces a number of messages instructing the OS/WM 12 and the application 14 on how to respond to the selection. For example, if the user selects the "Labels" option and then the "Center" option in the "Range Alignment" dialog box, messages are generated instructing the window manager 12 to move the input focus to the "Center" control window and instructing a hierarchical dialog box manager (HDBM) described below to mark the controls in the "Labels" group with glyphs and instructing the application 14 to center the alignment of the labels in a spreadsheet.

Before and after the messages reach or are sent to the application 14, however, the HDBM filters the messages from the OS/WM 12 so that both the application 14 and the OS/WM 12 receive only relevant messages. For example, HDBM might use an initialization message sent from the OS/WM 12 to auto-position the dialog window to an area of the screen when the window becomes visible.

The HDBM is an extension of the window manager in OS/WM 12. The window manager, e.g., Presentation Manager®, has its own dialog box manager. However, HDBM supports the hierarchical keystroke mnemonics described above in connection with Control Hierarchy and Control Marking. In addition, the HDBM provides access to a group of control windows contained within the dialog box that are not part of the hierarchy, e.g., "OK" and "Cancel" controls and fully maintains the standard Presentation Manager® mouse selection and pointing conventions for dialog boxes.

Referring again to FIG. 6, note that the HDBM is divided into two parts, namely the Front End Filter 18 and the Back End Filter 20. The Front End Filter 18 filters the messages from the OS/WM 12, routes or translates if necessary the relevant messages for the application 14, and then passes the messages to the application.

At run-time, the HDBM dialog box loader 13 captures and uses the parent/child arrangement of the controls specified in the definitions file 16 to graph the hierarchy of the dialog box so the HDBM can "navigate" between controls, i.e., move from one group of controls to another in proper sequence and move from one control to another within a group. Once the HDBM dialog box loader 13 has captured the hierarchical relationship between the controls, it "flattens" the dialog box window by making all the controls within the window children of the dialog window. This is done to simplify the message protocol imposed by the window manager 12 and controlled by the application 14 when creating and/or processing the dialog box.

Next, the application 14 filters and translates the messages it receives from the Front End Filter 18. The application 14, based on the definitions of the dialog box window and control windows in the definition file 16, executes any application specific operations on the affected control window and dialog box window. For example, the application 14 might validate text in a edit control box.

Next, the application 14 passes any messages that are not relevant, e.g., OS/WM primitive operations, to the Back End Filter 20. The Back End Filter 20 filters the messages and executes hierarchical operations. For example, if the selection of one control makes it impossible to select a second control, the Back End Filter 20 removes a glyph from the second control. Finally, the Back End Filter 20 passes the messages to the OS/WM 12 for any default processing that may be needed.

In addition, the HDBM fields all mouse events and keystroke events while the dialog box is active. If a control window that supports selection outside the dialog box has the input focus, a mouse event or certain keystroke events cause the dialog box to be resized and/or repositioned as described above. When the events indicating that the selection has been completed are received by the HDBM, the dialog box is restored to its original size and position. The resizing and repositioning is a low priority activity so that if the events indicating the selection have been completed are received prior to the onset of the resizing and repositioning of the dialog box, the resizing and repositioning do not take place.

Further, in connection with the noun verb and verb noun grammar, the application main body 11 supplies the dialog box with the object that the user has selected prior to issuing the command that invoked the dialog box so that the edit control box specifying the selection can be initialized accordingly with the current object.

The source code that embodies the HDBM procedures is attached as an appendix and is incorporated herein by reference. The programming language used is Microsoft C compiled with Microsoft C compiler version 5.1. Other tools used are a resource compiler, Microsoft Resource Compiler version 1.0, and a linker, Microsoft Linker 5.1.21. In addition, the source code depends upon library functions in Presentation Manager version 1.1 or 1.2.

Other embodiments are within the following claims.

We claim:

1. A method of implementing a screen comprising a plurality of data objects and a dialog box comprising a plurality of controls and a plurality of operations comprising the steps of:

generating said dialog box on said screen, having at least one control corresponding to an operation requiring selection among data objects currently displayed on the screen outside of said dialog box;

in response to user input for selection of data objects on the screen, altering display of said dialog box to reduce obstruction of the portion of the screen where the data objects undergoing selection are displayed;

enabling selection of said data objects within said screen; and executing said operation on said selected data objects.

2. The method of 1 wherein the altering of the display of the dialog box to reduce obstruction is invoked by user selection of a control from said dialog box which requires data object selection on the screen.

3. The method of 1 wherein in response to the completion of selection of said data objects within said screen, altering display of said dialog box so as to substantially restore the dialog box to the preceding display condition and wherein the operation executed on said selected data objects is selected from the restored dialog box.

4. A method of user interaction with displayed controls in the context of a computer software application user interface, comprising the steps of:

simultaneously symbolically displaying in a designated area of a screen a plurality of individual user selectable controls which govern the value or status of variables or commands within the application, said controls being continuously displayed throughout the following selection process;

making all of said simultaneously displayed controls available for user selection via at least two command paths differentiated by both the modes of user interaction with the interface and also their respective permissible sequences of selection of controls by the user;

one of said command paths being negotiated by means of a user controlled pointing device, the other of said command paths being negotiated by means of symbolic expression from the user interpretable by the user interface in terms of symbols;

allowing selection among said simultaneously displayed controls in a random order by pointing at said controls individually in a user-determined series with said pointing device; and alternatively at any given point in the series of selections, allowing selection among said simultaneously displayed controls by symbolic expression in accordance with a predetermined hierarchical linkage which governs the availability of certain ones of said simultaneously displayed controls to the user depending upon a preceding user selection among said simultaneously displayed controls.

5. The method of claim 4, wherein said symbolic expression is communicated via a keyboard.

6. The method of claim 4, wherein said pointing device is a mouse.

7. The method of claim 4, wherein said symbolic expression incorporates symbols having potentially nonunique associations with various ones of said controls.

8. The method of claim 4, wherein said designated area of the screen is defined by a dialog box.

9. The method of claim 4, further comprising guiding the user's choices for selection among said simultaneously symbolically displayed controls using symbolic expression by dynamically graphically distinguishing on the screen one subset of said controls at a time which is available for immediate selection by the user's symbolic expression in accordance with said hierarchical linkage, without thereby constraining the availability of said simultaneously displayed controls to selection via the pointing device.

10. The method of claim 9, wherein graphically distinguishing said controls is accomplished by temporarily associating substantially identical glyphs with respective controls comprising a group of simultaneously available controls on the screen to indicate their current selectability via symbolic expression.

11. A method of user interaction with displayed controls in the context of a computer software application user interface, comprising the steps of:

simultaneously symbolically displaying in a designated area of a screen a plurality of individual user selectable controls which govern the value or status of variables within the application, said controls being continuously displayed throughout the following selection process; and alternatively at any given point in a series of selections, allowing either of at least two modes of user selection of said controls chosen at will by the user, one of said command modes being implemented by means of symbolic expression from the user interpretable by the user interface in terms of symbols having potentially nonunique associations with various ones of said controls, the other of said command modes being implemented by means of a user controlled pointing device;

selection among said simultaneously displayed controls by symbolic expression being permitted only in accordance with a predetermined stored hierarchical linkage which governs the availability of certain ones of said simultaneously displayed controls to the user depending upon a preceding user selection among said simultaneously displayed controls;

selection among said simultaneously displayed controls by the user pointing at said controls individually with said pointing device being permitted in a user-determined series free of the constraint of said hierarchical linkage.

12. A dual mode method of user interaction with data on a screen and operations to be performed on said data in the context of a user interface for a computer software application, comprising the steps of:

alternatively, at any time within the same software application session, permitting the user who needs to perform an available operation on data objects present on a screen to choose between the following alternative noun/verb and verb/noun command paths:

(1) selecting data objects on screen first and then displaying a dialog box with controls corresponding to operations at least one of which is to be performed on selected data objects and permitting selection among said controls of an operation to perform on said already selected data object; and (2) enabling selection of one of said operations first from the same dialog box and subsequently selecting data objects on the same screen on which to perform said one operation.

* * * * *